May 10, 1955  F. B. BOLTE  2,707,810
TRANSPARENT CLOSURE
Filed July 30, 1951

INVENTOR.
FRANK B. BOLTE
BY
ATTORNEY

United States Patent Office 2,707,810
Patented May 10, 1955

2,707,810

TRANSPARENT CLOSURE

Frank B. Bolte, Los Angeles, Calif., assignor to North American Aviation, Inc.

Application July 30, 1951, Serial No. 239,343

5 Claims. (Cl. 20—56.5)

This invention relates to a transparent closure and more particularly to a closure for use with a transparent laminated material.

An object of this invention is to provide a closure that will form a positive seal between two panels.

Another object of this invention is to provide a closure having resilient properties.

A further object of this invention is to provide a closure that provides a large gripping area and secure fastening means without exerting a clamping pressure against a panel or requiring holes in the panel.

An additional object of this invention is to provide a closure that will allow for expansion and contraction of the panels secured together.

Still another object of this invention is to provide a closure that will allow uneven expansion of a laminated panel such as may be encountered when the outer surface is subjected to cold air and the inner surface is heated.

Yet another object of this invention is to provide a closure that is simple and economical to manufacture and is adapted for modern mass production methods.

These and other objects will become apparent from the following description taken in connection with the accompanying drawings in which.

Figures 1, 2, 3:
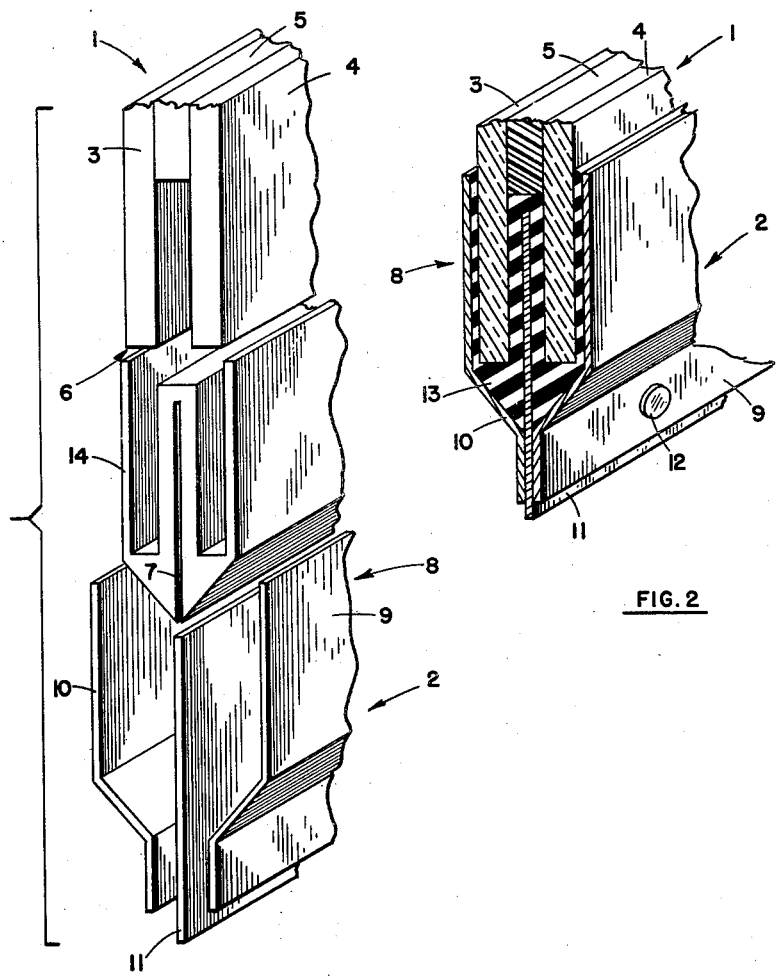
Fig. 1 is an elevation of the closure as employed with an aircraft canopy.
Fig. 2 is a perspective view, partly in section, of the closure comprising this invention.
Fig. 3 is an exploded view showing the elements of the closure comprising this invention.

The invention comprises a closure for holding transparent panel 1 to base panel 2 which typically may comprise, respectively, an aircraft canopy and a portion of the fuselage, or a member adapted for attachment to the fuselage, as shown in Fig. 1. The transparent panel may be of glass or any suitable transparent plastic material, and is ordinarily of a laminated construction including outer layers 3 and 4 and an inner layer 5. Edge 6 which is to be joined with panel 2 is constructed so that outer layers 3 and 4 project beyond inner layer 5, as clearly illustrated in Fig. 3, thus providing a slot or recess 7.

The base member 2, which may be of metal, plastic or any desired material, includes a trifurcated edge 8, the elements of which are parallel and include outer elements 9 and 10 and an inner element 11. Outer elements 9 and 10 may be secured at their bottom portions to inner element 11 by any suitable fastening means such as rivets 12. This trifurcated edge of the base panel is dimensioned so that it will loosely receive edge 6 of transparent panel 1 with layer 3 between adjacent surfaces of elements 9 and 11 and layer 4 between elements 10 and 11, element 11 thus projecting into slot 7. The term "edge" as used herein is intended to include the entire marginal portions of the elements of the panel and the base and not just the end surfaces perpendicular to the principal surfaces of these elements as perhaps would be a more conventional and restricted definition.

To secure panels 1 and 2 together and form a flexible seal between the panels, an adhesive material 13 may be interposed between the adjacent surfaces of the panels as shown in Fig. 2. This adhesive material may be in paste or liquid form when injected into the joint and may be of any suitable variety, but should not contract when it sets or hardens and should thereafter have resilient qualities. A catalytic rubber cement is particularly desirable for this usage.

Fig. 3 illustrates a modification of the invention in which a flexible element such as rubber member 14 is pre-formed so as to fit between adjacent surfaces of edge 6 of the transparent panel and trifurcated edge 8 of the base panel when the former is received within the latter. In such construction an adhesive material, such as cement 13, may bind rubber element 14 to the edges of each panel, the rubber element may be bonded to the base panel and cemented to the transparent panel, or it may be bonded only to element 11 of the base panel and cemented to the other surfaces.

In order to reduce stress concentrations and thus eliminate possible breakage of the transparent panel, it is desirable that outer elements 9 and 10 extend beyond inner element 11 of the trifurcated edge.

This transparent closure thus provides a maximum holding area between the panels to be joined by gripping adjacent surfaces of a trifurcated edge and a slotted edge received therein without exerting a clamping force against or requiring holes in any portion of the transparent panel. This makes a joint that is strong and particularly adaptable for use in an aircraft canopy where more pressure may be exerted within than without the canopy. Furthermore, the seal is flexible and will allow vibration without breaking the seal or the panels that are held together. This flexible quality will also allow an uneven expansion of the panels such as may occur, for example, when layer 3 is subjected to a cold atmosphere while heat is applied to layer 4 of the transparent panel 1.

The foregoing detailed description is to be understood as by way of illustration only and not by way of limitation, the spirit and scope of this invention being limited only by the accompanying claims.

I claim:

1. A closure comprising a transparent laminated panel including an inner layer and two outer layers, said panel having a margin where said outer layers project beyond said inner layer; a base member receiving said margin of said panel, said base member including a trifurcated margin the central element of which is received between said projecting outer layers of said laminated panel, and the two outer elements of which are disposed outside of said outer layers of said laminated panel, said elements of said trifurcated margin being spaced from said layers of said laminated panel; and a resilient fastening material interposed between all adjacent surfaces of said elements of said trifurcated margin and said margin of said laminated panel.

2. A closure comprising a transparent laminated panel including an inner layer and two outer layers, said panel having a margin where the outer layers project beyond said inner layer; a base panel having a trifurcated margin the elements of which are in spaced parallelism, the two outer elements of said base margin projecting beyond the central element, said elements of said trifurcated margin receiving said layers of said laminated panel in laterally spaced relationship therewith; and resilient means interposed between all adjacent surfaces of said laminated panel and said base panel for securing said panels together and forming a flexible seal therebetween.

3. A closure comprising a laminated panel having two outers layers and an inner layer and including a margin where said outer layers project beyond said inner layer; a base member including a trifurcated margin receiving said margin of said laminated panel, the elements of said base member being laterally spaced from the layers of said laminated panel; and a resilient material disposed within said margin of said base member between each element thereof and the adjacent surface of the layers of said laminated panel for securing said transparent panel to said base member.

4. A device as recited in claim 3 in which the outer portions of said trifurcated margin extend beyond the central portion thereof.

5. A closure comprising a transparent panel having a margin having an elongated slot therein; a base panel having a trifurcated margin receiving said margin of said transparent panel with the central element of said trifurcated margin extending into said slot, and all elements of said trifurcated margin being spaced from said panel; and resilient means interposed between all adjacent surfaces of said panels for securing said panels together.

References Cited in the file of this patent

UNITED STATES PATENTS

| | | |
|---|---|---|
| 1,929,892 | Kellner | Oct. 10, 1933 |
| 2,392,129 | Downes | Jan. 1, 1946 |
| 2,409,808 | Sowle | Oct. 22, 1946 |
| 2,537,804 | Watkins | Jan. 9, 1951 |
| 2,620,522 | Fish et al. | Dec. 9, 1952 |